(12) United States Patent
Lu

(10) Patent No.: US 12,236,001 B2
(45) Date of Patent: *Feb. 25, 2025

(54) METHOD AND APPARATUS FOR PROTECTING A PUF GENERATOR

(71) Applicant: Taiwan Semiconductor Manufacturing Co., Ltd., Hsin-Chu (TW)

(72) Inventor: Shih-Lien Linus Lu, Hsinchu (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/404,355

(22) Filed: Jan. 4, 2024

(65) Prior Publication Data

US 2024/0202374 A1    Jun. 20, 2024

Related U.S. Application Data

(63) Continuation of application No. 17/859,513, filed on Jul. 7, 2022, now Pat. No. 11,899,828, which is a
(Continued)

(51) Int. Cl.
*G06F 21/75* (2013.01)
*G11C 11/412* (2006.01)
(Continued)

(52) U.S. Cl.
CPC .......... *G06F 21/755* (2017.08); *G11C 11/412* (2013.01); *G11C 11/418* (2013.01);
(Continued)

(58) Field of Classification Search
CPC ... G06F 21/755; G11C 11/412; G11C 11/418; G11C 11/419; G11C 7/12; G11C 7/20;
(Continued)

(56) References Cited

U.S. PATENT DOCUMENTS 6,285,580 B1 * 9/2001 Phan ................... G11C 11/4125
365/188
7,193,482 B2 * 3/2007 Silverbrook ....... H04N 1/00965
331/78

(Continued)

OTHER PUBLICATIONS

Tehranipoor et al.; DRAM-Based Intrinsic Physically Unclonable Functions for System-Level Security and Authentication, 2017, IEEE Transactions on Very Large Scale Integration (VLSI) Systems, vol. 25, No. 3, pp. 1085-1096. (Year: 2017).*

(Continued)

*Primary Examiner* — Matthew Smithers
(74) *Attorney, Agent, or Firm* — Duane Morris LLP

(57) ABSTRACT

Methods and apparatus for protecting a physical unclonable function (PUF) generator are disclosed. In one example, a PUF generator is disclosed. The PUF generator includes a PUF cell array, a PUF control circuit and a reset circuit. The PUF cell array comprises a plurality of bit cells. Each of the plurality of bit cells is configurable into at least two different stable states. The PUF control circuit is coupled to the PUF cell array and is configured to access each of the plurality of bit cells to determine one of the at least two different stable states upon a power-up of the plurality of bit cells, and generate a PUF signature based on the determined stable states of the plurality of bit cells. The reset circuit is coupled to the PUF cell array and is configured to set the plurality of bit cells to represent their initialization data based on an indication of a voltage tempering event of a supply voltage of the PUF cell array.

20 Claims, 8 Drawing Sheets

Related U.S. Application Data continuation of application No. 16/943,533, filed on Jul. 30, 2020, now Pat. No. 11,409,915, which is a continuation of application No. 16/019,283, filed on Jun. 26, 2018, now Pat. No. 10,733,327.

(51) Int. Cl.
  *G11C 11/418* (2006.01)
  *G11C 11/419* (2006.01)
  *H03K 19/003* (2006.01)
  *H04L 9/00* (2022.01)
  *H04L 9/32* (2006.01)

(52) U.S. Cl.
  CPC ...... *G11C 11/419* (2013.01); *H03K 19/00315* (2013.01); *H04L 9/002* (2013.01); *H04L 9/3278* (2013.01)

(58) Field of Classification Search
  CPC ........... G11C 7/24; G11C 8/10; G11C 11/413; G11C 11/4125; H03K 19/00315; H04L 9/002; H04L 9/3278; H04L 2209/12; Y04S 40/20
  See application file for complete search history.

(56) References Cited

U.S. PATENT DOCUMENTS

| | | | |
|---|---|---|---|
| 9,262,256 B2* | 2/2016 | Mathew | G06F 11/0793 |
| 9,806,719 B1 | 10/2017 | Mathew et al. | |
| 9,947,391 B1 | 4/2018 | Mahatme et al. | |
| 10,164,640 B1 | 12/2018 | Lu et al. | |
| 10,708,041 B2* | 7/2020 | Kvatinsky | H04L 9/3242 |
| 10,733,327 B2* | 8/2020 | Lu | H03K 19/00315 |
| 10,891,366 B1 | 1/2021 | Wu et al. | |
| 10,985,453 B2 | 4/2021 | Le et al. | |
| 11,190,365 B2 | 11/2021 | Lu | |
| 11,409,915 B2* | 8/2022 | Lu | H04L 9/002 |
| 11,899,828 B2* | 2/2024 | Lu | H04L 9/002 |
| 2003/0226082 A1 | 12/2003 | Kim et al. | |
| 2007/0058452 A1 | 3/2007 | Kim et al. | |
| 2008/0205112 A1* | 8/2008 | Lawson | G11C 11/4125 365/230.06 |
| 2009/0326840 A1* | 12/2009 | Gebara | G06F 21/73 702/57 |
| 2013/0202107 A1 | 8/2013 | Danger | |
| 2013/0275817 A1 | 10/2013 | Bancel | |
| 2016/0156476 A1 | 6/2016 | Lee et al. | |
| 2016/0328578 A1 | 11/2016 | Plusquellic et al. | |
| 2016/0351259 A1* | 12/2016 | Jeon | G11C 13/0064 |
| 2017/0048072 A1* | 2/2017 | Cambou | G11C 15/046 |
| 2018/0102907 A1 | 4/2018 | Lin et al. | |
| 2018/0151224 A1* | 5/2018 | Chih | G11C 13/0007 |
| 2019/0305972 A1 | 10/2019 | Yao | |
| 2019/0325171 A1 | 10/2019 | Obermaier et al. | |
| 2020/0381372 A1 | 12/2020 | Kozicki et al. | |

OTHER PUBLICATIONS

Barbareschi et al.; "Supply Voltage Variation Impact on Anderson PUF Quality", 2015, IEEE, pp. 1-6. (Year: 2015).*

Oren, Y. et al., "On the Effectiveness of the Remanence Decay Side-Channel to Clone Memory-based PUFs", CHES 2013:Cryptographic Hardware and Embedded Systems, Lecture Notes in Computer Science, vol. 8086, Springer, Berlin, Heidelberg, pp. 1-19.

Zeitouni, S. et al., "Remanence Decay Side-Channel: The PUF Case", IEEE Transactions on Information Forensic and Security, Jun. 2016, 2(6):1106-1116.

Goikoetxea Yanci, A. et al., "Detecting Voltage Glitch Attacks on Secure Devices", BLISS 2008, ECIS Symposium on Bio-Inspired Learning and Intelligent Systems for Security, pp. 75-80.

Jason Anderson; "A PUF Design for Secure FPGA-Based Embedded Systems"; 2010, IEEE, pp. 1-6. (Year: 2010).

Pandey et al.; "Noise-Resilient SRAM Physically Unclonable Function Design for Security", 2016, IEEE 25th Asian West Symposium , pp. 55-60. (Year: 2016).

Ghosh et al.; "Security and Privacy Threats to On-Chip Non-Volatile Memories and Countermeasures"; 2016, ACM, pp. 1-6. (Year: 2016).

Wang et al.; "A Low-overhead PUF based on Parallel Scan Design", 2018, IEEE, pp. 715-720. (Year: 2018).

* cited by examiner

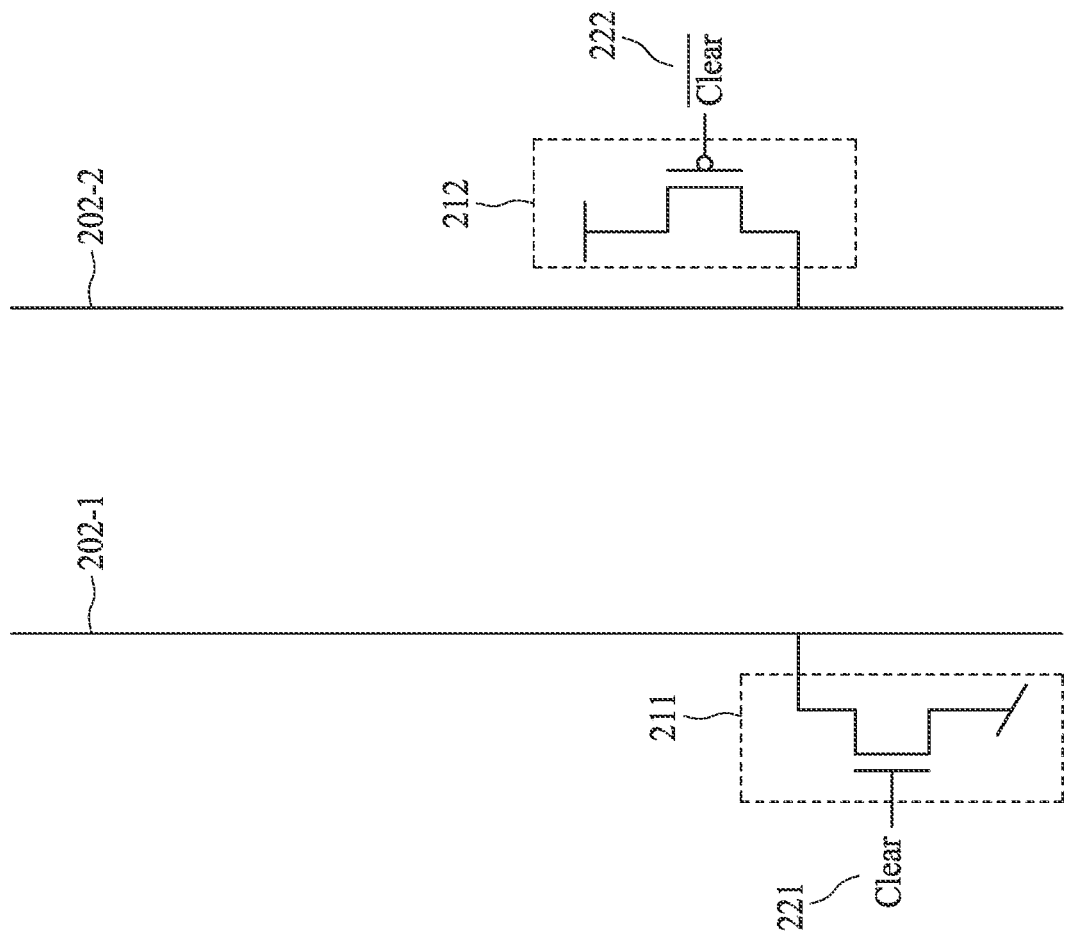

METHOD AND APPARATUS FOR PROTECTING A PUF GENERATOR

CROSS-REFERENCE TO RELATED APPLICATIONS

This application is a continuation of U.S. patent application Ser. No. 17/859,513, filed Jul. 7, 2022, which is a continuation of U.S. patent application Ser. No. 16/943,533, filed on Jul. 30, 2020, which is a continuation of U.S. patent application Ser. No. 16/019,283, filed on Jun. 26, 2018, now U.S. Pat. No. 10,733,327, issued on Aug. 4, 2020, each of which is incorporated by reference herein in its entirety.

BACKGROUND

A physically unclonable function (PUF) is a physical structure generally within an integrated circuit that provides a number of corresponding outputs (e.g., responses) in response to inputs (e.g., challenges/requests) to the PUF. Each PUF provides one or more sets of request-response pairs. An identity of the integrated circuit may be established by such request-response pairs provided by the PUF.

When a memory cell, e.g. a static random-access memory (SRAM) cell, is used for storing user data and generating PUF, PUF bits (or at least partial PUF bits) may be obtained by lowering the supply voltage powering the cell. A first approach to prevent the cell retention failure attack is to require a separate SRAM block just for building the PUF, which contradicts the idea of using the existing memory of the device for generating PUF and significantly increases the implementation costs. A second approach is to wait until any value stored in the memory has decayed before reading data, once a power tempering is detected. This requires the device to have some notion of time and significantly increases the boot time, which is problematic in many applications. A third approach is to obfuscate the bits used for security purpose by designing the algorithms processing the PUF response such that the device behavior for different start-up states is indistinguishable by the adversary. However, this needs complex cryptographic primitives such as anonymous authentication schemes that typically exceed the capabilities of resource-constrained devices for which a SRAM based PUF is proposed. As such, existing methods and PUF generators are not entirely satisfactory for preventing a cell retention failure attack.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion. Like reference numerals denote like features throughout specification and drawings.

FIG. 2C illustrates exemplary circuit diagrams of transistors connected to columns of the PUF cell array in FIG. 2A, in accordance with various embodiments of the present disclosure.

DETAILED DESCRIPTION

Figure 1:
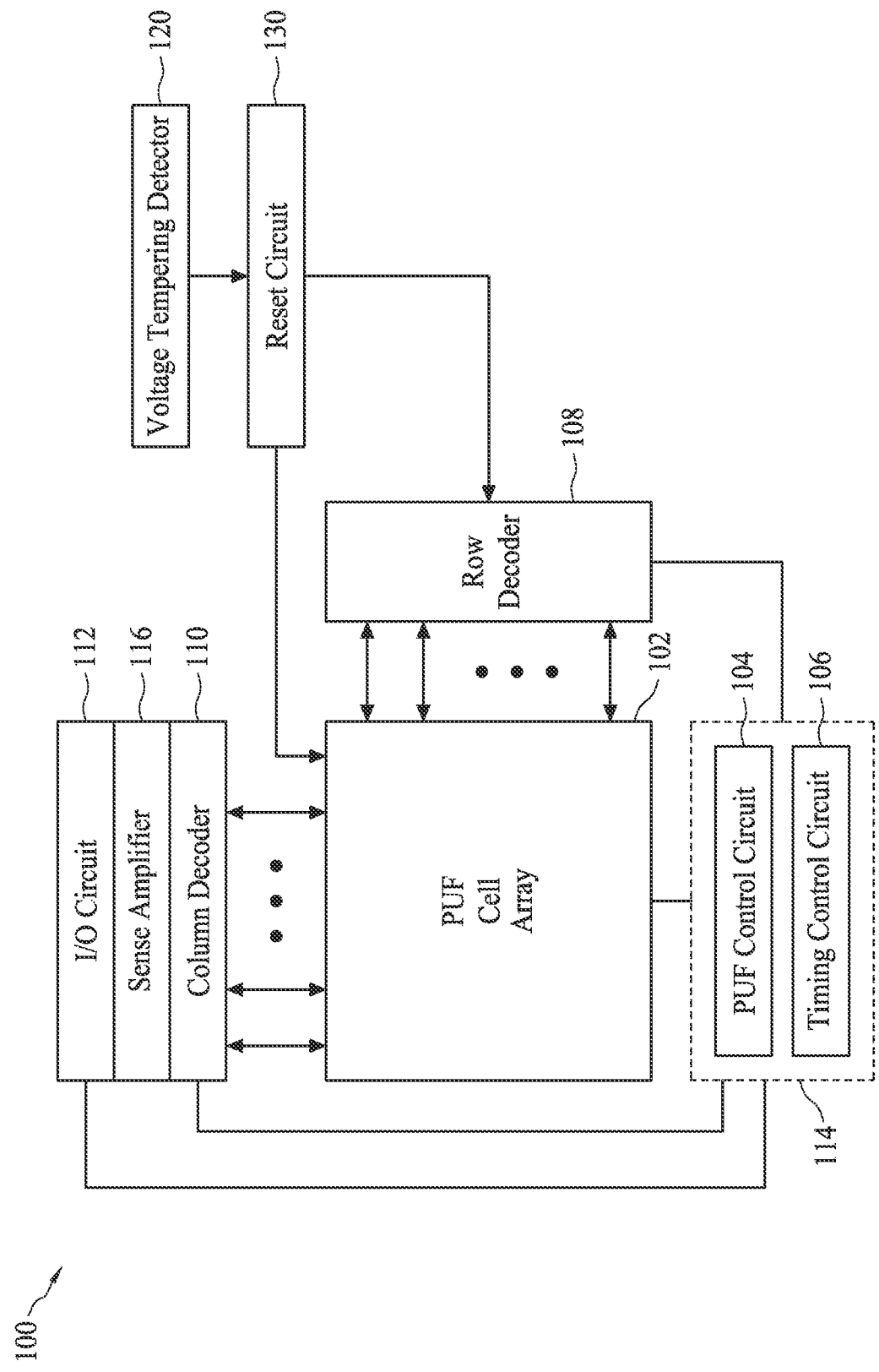
FIG. 1 illustrates an exemplary block diagram a physical unclonable function (PUF) generator, in accordance with various embodiments of the present disclosure.

The following disclosure describes various exemplary embodiments for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference will now be made in detail to the present embodiments of the disclosure, examples of which are illustrated in the accompanying drawings. Wherever possible, the same reference numbers are used in the drawings and the description to refer to the same or like parts.

A PUF harvests random manufacturing variations within die of electronic components to generate a unique bit vector which can be used for IC chip identification. These components, even though designed to be exactly the same, differ from each other in both physical dimension and material properties due to uncontrollable physical phenomena throughout the manufacturing processes. For example, a transistor may have slightly different channel length and width due to the lithography processes. Similarly, wires may have different length and width even though their layouts during design are exactly the same. Fabrication process may also cause physical dimension differences such as variations on gate thickness and wire thickness. Other processing steps may cause material variations, e.g., transistors specified with the same values for width and length may not end up with exactly the same physical dimension after fabrication. Moreover, their channel doping concentration may be different due to random dopant fluctuation even the physical size is the same. These dimensional and material differences cause these components to have different electrical properties even though they are designed to be exactly the same.

There are many different implementation approaches of PUF generators. One example is delay chain based PUFs. This type of PUFs translates variations (difference) into delay variances. They employ a set of delay chains made out of logic gates. Due to static variations of components, each chain will have different delay. A PUF signature can be produced by sampling the delay. Another example is memory based PUFs. This approach translates variations of devices in a bi-stable element to generate either a logic 1 or a logic 0. SRAM PUFs are memory based PUFs that utilize the small memory cell variations to produce PUF signatures. For example, SRAM PUFs can get their signatures from the start-up states of cells. This type of PUFs is an array of SRAM cells that are powered up and down through a virtual power supply. Since each cell includes a cross-coupled inverter pair and their strength varies, when a cell is powered up, it will take a random logical value ("0" or "1") depending on the characteristics of the cross-coupled inverters. It arrives at the value pretty consistently as the minor differences in transistor electrical properties are self-amplified by the cross-coupled inverter pair. This kind of SRAM power-up state based PUF is popular because most, if not all, existing integrated circuits already have many different SRAM blocks used for other purposes. For example, a CPU has many SRAM blocks used as caches; a GPU has SRAM scratch pads (buffers) used for direct software caching; and a field-programmable gate array (FPGA) chip have both configuration memory and block RAM made out of SRAM. These SRAM blocks can be used as PUF generators as well as a storage unit. The SRAM block used as PUF is power cycled and the PUF data bits are obtained through a specific secure port as an interface.

Although the access of PUF bits are exclusive and controlled, when an SRAM block is used both as a PUF generator and a storage unit, there is a way to obtain PUF bits or at least partial PUF bits by introducing a supply voltage tempering into the SRAM operation. When an SRAM cell loses the supply voltage temporary or the supply voltage powering the cell is lowered to a point below a specified threshold, it will cause a cell retention failure. When retention failure happens, this cell will go to its start-up state which is used for PUF purpose. That is, the value of the cell is no longer the value stored using the normal write operation but the PUF value used for security purpose.

To protect a PUF generator from attack, e.g. the cell retention failure attack, the present disclosure provides a method based on a novel circuit to a memory array. The disclosed PUF generator is built from a memory cell array with an additional path to reset cells when the tempering of the supply voltage has been detected.

In accordance with some embodiments of the present teaching, a PUF generator is disclosed. The PUF generator includes a PUF cell array, a PUF control circuit and a reset circuit. The PUF cell array comprises a plurality of bit cells. The PUF control circuit is configured to access the plurality of bit cells and generate a PUF signature based on logical states of the plurality of bit cells. The reset circuit is configured to set the plurality of bit cells to their initialization data based on their initial logical states upon an indication of a voltage tempering event of a supply voltage of the PUF cell array. The initial logical states of the plurality of bit cells are predetermined logical states before the cell array stores any user data or before the cell array is used as a data storage. The voltage tempering event happens when there is a supply voltage glitch or droop below a predetermined threshold, and is detected by a voltage tempering detector inside or coupled to the PUF generator. The initial logical states of the plurality of bit cells are equal to a same logical state, e.g. a same logic 0 or a same logic 1.

In one embodiment, the PUF cell array is also a memory cell array, e.g. a SRAM cell array, configured for storing user data. The reset circuit generates a clear signal based on the indication of the voltage tempering event. The clear signal triggers two additional transistors connected to each column of the cell array to lock a logic 0 on the bit line of the column and lock a logic 1 on the bit bar line of the column. In addition, the PUF generator includes a row decoder that is coupled to all word lines of the cell array and receives a clear bar signal that is an inverse of the clear signal. Upon detection of the supply voltage tempering, the clear bar signal triggers the row decoder to lock each word line to a logic 1 to turn on the word line. As such, all cells are forced to the same initial state, which prevents an attack via supply voltage tempering on the PUF generator.

For a small SRAM array, the reset circuit may set all bit cells to their initial logical states simultaneously. When the clear signal and clear bar signal need to drive a large number of transistors, they can be buffered to step through rows of the cell array. For example, when the number of rows is large, e.g. 128 rows in a bit line, the clear signal can step through the rows one by one. In one embodiment, the reset circuit comprises a finite state machine (FSM) that can pull the bit lines and bit bar lines to the logic 0 and logic 1 respectively, wherein the bit cells of each row are reset separately with a counter, one row at a time. In the present teaching, the terms "memory cell," "cell," and "PUF cell" may be used interchangeably herein; the terms "bit bar line" and "bit line bar" may be used interchangeably herein.

FIG. 1 illustrates an exemplary block diagram a PUF generator 100, in accordance with various embodiments of the present disclosure. It is noted that the PUF generator 100 is merely an example, and is not intended to limit the present disclosure. Additional functional blocks may be provided in or coupled to the PUF generator 100 of FIG. 1, and that some other functional blocks may only be briefly described herein.

As shown in FIG. 1, the PUF generator 100 comprises a PUF cell array 102, a row decoder 108, and a column decoder 110. The row decoder 108 and the column decoder 110 are coupled to a plurality of bit cells in the PUF cell array 102. The PUF generator 100 further comprises a sense amplifier 116, an input/output (I/O) circuit 112, a PUF control circuit 104 and a timing control circuit 106 in the illustrated embodiment. All the components may be coupled to each other and further to the PUF control circuit 104 in the authentication circuit 114. The PUF generator 100 further comprises a reset circuit 130 that is coupled to the PUF cell array 102 and the row decoder 108. The reset circuit 130 may be coupled to a voltage tempering detector 120. The voltage tempering detector 120 may be either inside the PUF generator 100 as shown in FIG. 1 or outside but coupled to the PUF generator 100 via the reset circuit 130.

Although each component is shown as a separate block in FIG. 1, bit cells are arranged in a column-row configuration, i.e., an array, which will be shown and discussed in further detail below with respect to an exemplary schematic diagram of FIG. 2A. The PUF cell array 102 includes a plurality of bit cells that are arranged in a column-row configuration in which each column has a bit line (BL) and a bit line bar (BLB) and each row has a word line (WL). More specifically, the BL and BLB of each column are respectively coupled to a plurality of bit cells that are disposed in that column, and each bit cell in that column is arranged on a different row and coupled to a respective (different) WL. That is, each bit cell of the PUF cell array 102 is coupled to a BL of a column of the PUF cell array 102, a BLB of the column of the PUF cell array 102, and a WL of a row of the PUF cell array 102. In some embodiments, the BL's and BLB's are arranged in parallel vertically and the WL's are arranged in parallel horizontally (i.e., perpendicular to the BL's and BLB's). It should be noted that the BL, BLB and WL can be arranged differently according to different fabrication technologies and device layout designs, which are within the scope of the disclosure.

The authentication circuit 114 is configured to receive a request/challenge through the I/O circuit 112 (e.g., a request to power on the coupled PUF cell array 102, a request to access the PUF signature of the PUF cell array 102, etc.). In some embodiments, the authentication circuit 114 is configured to transmit a response based on the logical states of the bit cells of the PUF cell array 102 through the I/O circuit 112 (e.g., a PUF output) to a filter (not shown in FIG. 1) for generating the PUF signature. In some embodiments, the filter can be used to evaluate and characterize all the bit cells in the PUF cell array 102 over multiple times of evaluation trials and to filter out unstable/unpredictable bit cells in the PUF cell array 102 in order to generate a stable PUF signature.

In some embodiments, such I/O circuit 112 may be directly coupled to the PUF control circuit 104 of the authentication circuit 114. The PUF control circuit 104 is configured to control (e.g., increase or decrease) a voltage level of a supply voltage applied at each of the bit cells, control (e.g., increase or decrease) a voltage level applied at each of the WL, e.g. to a power supply voltage or a zero voltage. In some embodiments, the PUF control circuit 104 may enable the voltage supply to at least one selected column and at least one selected row. Further, the PUF control circuit 114 may switch between the evaluation mode and the normal operation mode.

In some embodiments, the PUF control circuit 104 may control a periodic reading of logical states of the bit cells. In some alternative embodiments, the PUF control circuit 104 may be implemented as a separate block, which is not embedded in the PUF cell array 102. In some embodiments, the PUF control circuit 104 can be embedded in the PUF cell array 102. In some embodiments, the timing control circuit 106 provide control and synchronization on pulse signals during read and write processes. In some embodiments, all the components of the authentication circuit 104 (i.e., the PUF control circuit 104 and timing control circuit 106) may be coupled to a common data bus for inter-communication.

In one illustrated embodiment, each of the bit cells of the PUF cell array 102 comprises a 6-transistors (6T-SRAM) bit cell, which will be described in further detail below in FIG. 2B. However, the bit cells of the PUF cell array 102 may be implemented as any of a variety of types of memory cells such as, for example, 2T-2R SRAM bit cell, 4T-SRAM bit cell, 8T-SRAM bit cell, DRAM bit cells, etc., according to various embodiments of present disclosure.

The row decoder 108 is configured to receive a row address of the PUF cell array 102 and apply a WL at that row address. In some embodiments, the column decoder 110 may be optional. The column decoder 110 is configured to receive a column address of the PUF cell array 102 and apply a BL and/or BLB at that column address. The sense amplifier 116 and I/O circuit 112 are configured to access a logical state (i.e., a logical "1" or a logical "0") at each of the bit cells in the PUF cell array 102. In some embodiments, a logical state of a bit cell may be written to or read from a bit cell by the I/O circuit 112. As described above, in some embodiments, the PUF control circuit 104 is coupled to all the components and configured to control the coupled components.

In order to protect the PUF generator 100 from a cell retention failure attack, the reset circuit 130 generates a clear signal upon receiving an indication from the voltage tempering detector 120 that a voltage tempering event happens. A cell retention failure attack includes playing with the supply voltage, e.g. causing the cell array to lose the supply voltage temporary or lowering the supply voltage below a certain threshold.

The voltage tempering detector 120 in this example is capable of detecting a supply voltage glitch or droop below a predetermined threshold. The voltage tempering detector 120 may be a voltage detection circuit in the integrated circuit to make sure the integrated circuit operates correctly all the time, regardless whether there is a cell retention failure attack or not. In one example, the voltage tempering detector 120 detects the voltage tempering event of the supply voltage of the PUF cell array, and sends the indication to the reset circuit 130 upon the detection.

The reset circuit 130 in this example may determine a voltage droop based on the indication and compare the voltage droop with a predetermined threshold. When the voltage droop is larger than the predetermined threshold, the reset circuit 130 generates a clear signal and/or a clear bar signal that is an inverse of the clear signal. The reset circuit 130 sends the clear signal and/or the clear bar signal to the PUF cell array 102 and the row decoder 108 to reset each of the plurality of bit cells in the PUF cell array 102 to its initial logical state to avoid the cell retention failure attack.

In one embodiment, each column of the PUF cell array 102 is connected to two additional transistors. For example, each bit line is electrically connected to a drain end of a first transistor, wherein a source end of the first transistor is electrically connected to a system ground, and wherein a gate end of the first transistor is controlled by the clear signal generated by the reset circuit 130 based on the indication of the voltage tempering event. In addition, each bit bar line is electrically connected to a drain end of a second transistor, wherein a source end of the second transistor is electrically connected to a logic high voltage, and wherein a gate end of the second transistor is controlled by the clear bar signal that is a reverse of the clear signal. The clear signal triggers the first transistor to lock each bit line to its initial logical state, e.g. a logic 0; and the clear bar signal triggers the second transistor to lock each bit bar line to its initial logical state, e.g. a logic 1. In one example, the reset circuit 130 generates the clear signal, and the PUF cell array 102 generates a coupled clear bar signal by inverting the clear signal. In another example, the reset circuit 130 generates a pair of clear and clear bar signals and sends them together to the PUF cell array 102. A detailed description will be provided regarding FIG. 2C.

In one embodiment, the row decoder 108 includes a plurality of inverters, a plurality of AND gates, and a plurality of NAND gates. Each inverter has an output connected to a corresponding word line of the PUF cell array 102. Each AND gate has an output connected to an input of one of the plurality of inverters. Each NAND gate has an output connected to a first input of one of the plurality of AND gates. The second input of each of the plurality of AND gates receives the clear bar signal generated by the reset circuit 130. As such, when the clear signal is activated upon detection of the voltage tempering, the row decoder 108 will lock every word line of the PUF cell array 102 to logic 1 to enable all word lines for resetting. In one example, the reset circuit 130 generates the clear signal, and the row decoder 108 generates a coupled clear bar signal by inverting the clear signal. In another example, the reset circuit 130 generates a pair of clear and clear bar signals and sends the clear bar signal to the row decoder 108. A detailed description will be provided regarding FIG. 4.

In one embodiment, the voltage tempering detector 120 may compare the detected voltage droop or tempering with a threshold, and send the tempering event indication to the reset circuit 130 when the voltage droop is larger than the threshold, such that the reset circuit 130 can directly generate the clear signal upon receiving the tempering event indication from the voltage tempering detector 120. In another embodiment, the voltage tempering detector 120 may generate an indication in response to any detected voltage droop or tempering, and send the tempering event indication to the reset circuit 130 to indicate a value of the voltage droop. In this case, the reset circuit 130 may compare the value of the voltage droop with a threshold and generate the clear signal when the value of the voltage droop is larger than the threshold. In yet another embodiment, the voltage tempering detector 120 may compare the detected voltage droop or tempering with a first threshold, and send the tempering event indication to the reset circuit 130 to indicate a value of the voltage droop when the voltage droop is larger than the first threshold. In this case, the reset circuit 130 may compare the value of the voltage droop with a second threshold and generate the clear signal when the value of the voltage droop is larger than the second threshold. While the first threshold is set to ensure a normal operation of the integrated circuit, the second threshold is set to protect the PUF generator 100 from a voltage tempering attack.

The reset circuit 130 may set all bit cells to their initial logical states simultaneously when the size of the cell array is small, e.g. smaller than 64*64. When the clear signal and clear bar signal need to drive a large number of transistors, e.g., when the size of the cell array is larger than or equal to 64*64, the clear signal and clear bar signal can be buffered to step through rows of the cell array. For example, when the number of rows is large, e.g. 128 rows in a bit line, the clear signal can step through the rows one by one to reset each row to its initial state.

In some embodiments, the reset circuit 130 comprises a finite state machine (FSM). The FSM of the reset circuit 130 may comprise a plurality of dynamic flip-flop (DFF) circuits, a counter, and an evaluation logic circuit, which are not shown in FIG. 1. In some embodiments, the FSM can pull the bit lines and bit bar lines to the logic 0 and logic 1 respectively, by separately resetting the bit cells of each row with the counter, one row at a time.

Figure 2A:
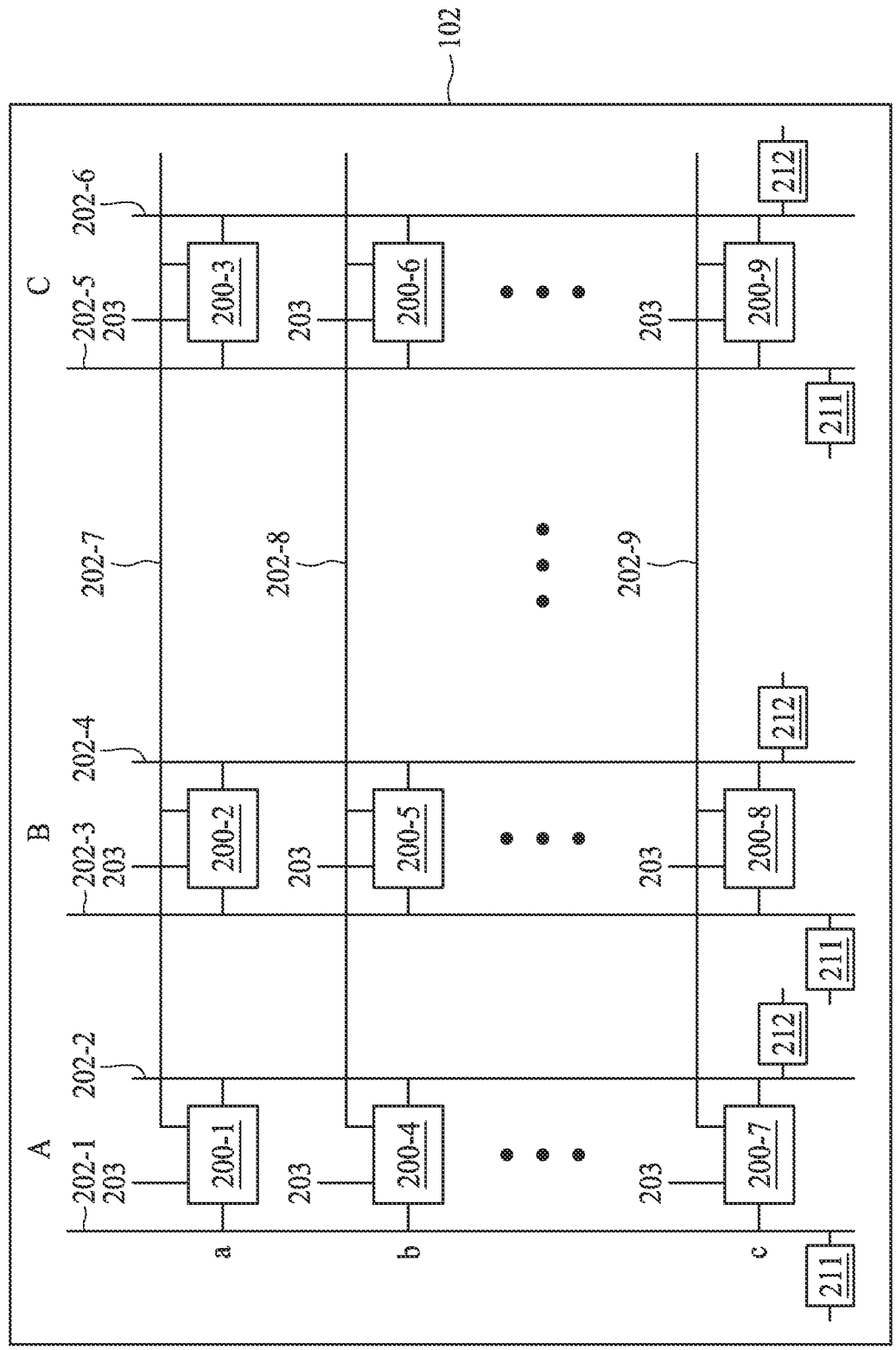
FIG. 2A illustrates an exemplary circuit diagram of a PUF cell array comprising a plurality of bit cells, in accordance with various embodiments of the present disclosure.

FIG. 2A illustrates an exemplary circuit diagram of a PUF cell array, e.g. the PUF cell array 102 in FIG. 1, comprising a plurality of bit cells, in accordance with various embodiments of the present disclosure. In some embodiments, the PUF cell array 102 includes a plurality of bits 200-1, 200-2, 200-3, 200-4, 200-5, 200-6, 200-7, 200-8, and up to 200-9. Although only 9 bits are shown, any desired number of bits may be included in the PUF cell array 102 while remaining within the scope of the present disclosure. As described above, the bits 200-1, 200-2, 200-3, 200-4, 200-5, 200-6, 200-7, 200-8, and 200-9 are arranged in a column-row configuration. More specifically, in some embodiments, the PUF cell array 102 includes bit lines (BL's) 202-1, 202-3, and 202-5 arranged in parallel, bit bar lines (BBL's) 202-2, 202-4, and 202-6 also arranged in parallel, and word lines (WL's) 202-7, 202-8, and 202-9 arranged in parallel orthogonally to the BL's and BBL's. As such, the PUF cell array 102 may include a first plurality of columns (e.g. arranged vertically) and a second plurality of rows (e.g., arranged horizontally), wherein each column includes a respective pair of BL and BBL and each row includes a respective WL. For example, as shown in the illustrated embodiment of FIG. 2A, the PUF cell array 102 includes columns "A," "B," and "C," and rows "a," "b," and "c," wherein column A includes respective BL 202-1 and BBL 202-2; column B includes respective BL 202-3 and BBL 202-4; column C includes respective BL 202-5 and BBL 202-6; row a includes a respective WL 202-6; row b includes a respective WL 202-8; and row c includes a respective WL 202-9.

Moreover, each column includes one or more bits that are each coupled to the column's respective BL and BBL, and a different separate WL. For example, column A includes bits 200-1, 200-4, and 200-7, wherein the bits 200-1, 200-4, and 200-7 are each coupled to the BL 202-1 and BBL 202-2, and WL's 202-7, 202-8, and 202-9, respectively; column B includes bits 200-2, 200-5, and 200-8, wherein the bits 200-2, 200-5, and 200-8 are each coupled to the BL 202-3 and BBL 202-4, and WL's 202-7, 202-8, and 202-9, respectively; and column C includes bits 200-3, 200-6, and 200-9, wherein the bits 200-3, 200-6, and 200-9 are each coupled to the BL 202-5 and BBL 202-6, and WL's 202-7, 202-8, and 202-9, respectively.

As shown in FIG. 2A, each column includes two transistors 211, 212 connected to the BL and BBL, respectively, of the column. The two transistors are utilized to reset the bit cells of this column to their initial logical states based on a clear signal and/or a clear bar signal generated upon a detection of a supply voltage tempering, where all word lines are enabled based on the clear bar signal as well. The two transistors 211, 212 are described in further detail below with reference to FIG. 2C.

As described above, each bit of the PUF cell array 102 (e.g., 200-1, 200-2, 200-3, 200-4, 200-5, 200-6, 200-7, 200-8, 200-9, etc.) may include a plurality of transistors (e.g., six MOSFET's for a 6T SRAM bit, eight MOSFET's for an 8T SRAM bit, etc.) to store a data bit. In some embodiments, such a data bit stored in each bit may be written to the bit by applying either a high state (i.e., a logical "1") or a low state (i.e., a logical "0") through a corresponding BL, BBL, and/or WL, which will be described in further detail below.

Figure 2B:
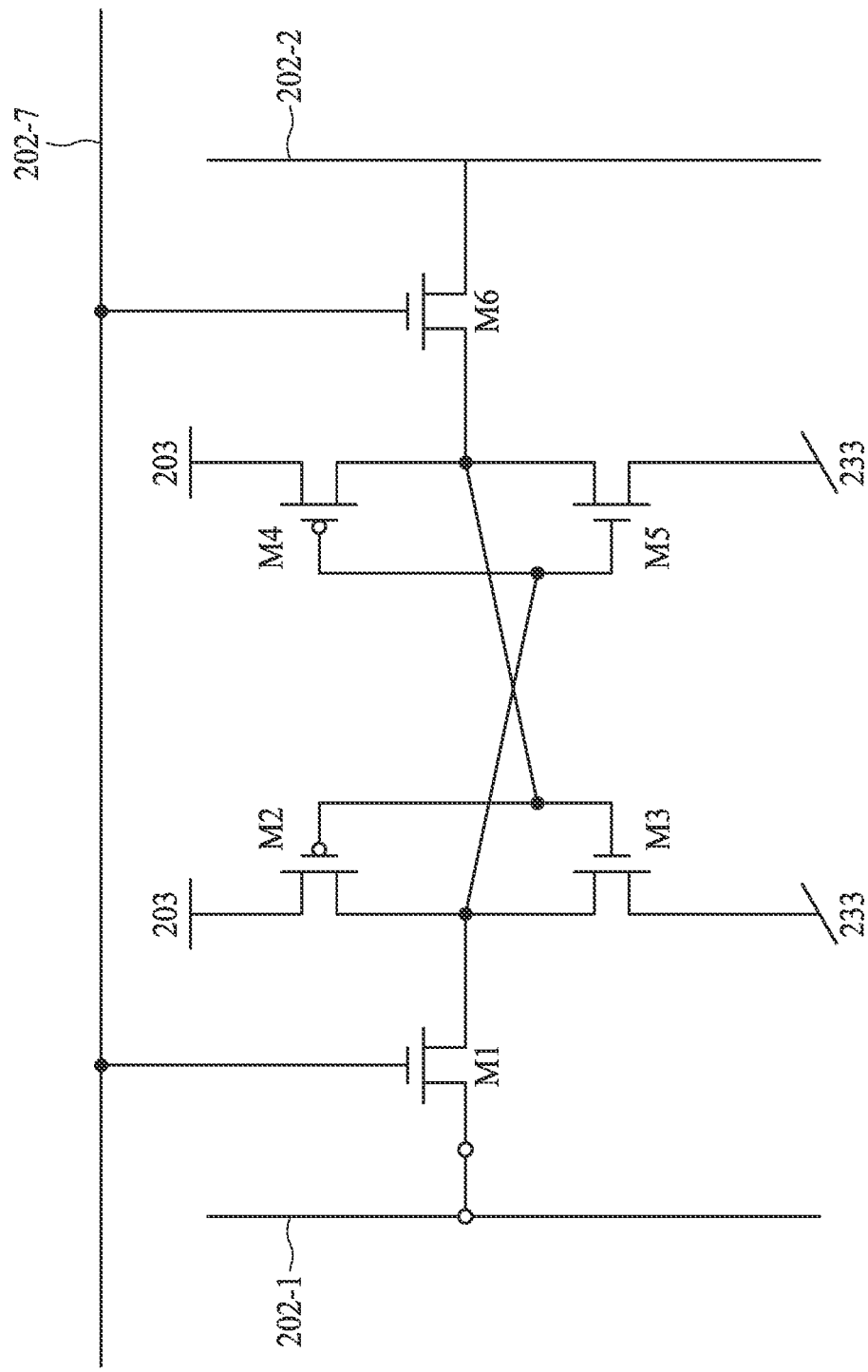
FIG. 2B illustrates an exemplary circuit diagram of a bit cell in the PUF cell array in FIG. 2A, in accordance with various embodiments of the present disclosure.

FIG. 2B illustrates an exemplary circuit diagram of the bit 200-1 that is implemented as a 6T-SRAM bit, in accordance with various embodiments of the present disclosure. As shown in FIG. 2B, the bit 200-1 includes transistors: M1, M2, M3, M4, M5, and M6. Since the bits of the PUF cell array 102 are substantially similar to one another, for clarity, the following discussions of configurations and operations of the transistors of the bits will be directed to the bit 200-1 only.

In some embodiments, the transistor M2 and M3 are formed as a first inverter and the transistors M4 and M5 are formed as a second inverter wherein the first and second inverters are coupled to each other. More specifically, the first and second inverters are each coupled between first voltage reference 203 and second voltage reference 233. Generally, the first voltage reference 203 is a voltage level of a supply voltage applied to the bit 200-1. In some embodiments, the first voltage reference 203 is typically referred to as a "power supply voltage."

The second voltage reference 233 is typically referred to as "ground." The power supply voltage 203 may range from about 30% of Vdd to about 130% of Vdd, wherein Vdd is a nominal voltage level applied to each of the bits of the PUF cell array 102 when the PUF cell array 102 is accessed. Further, the first inverter is coupled to the transistor M1, and the second inverter is coupled to the transistor M6. In addition to being coupled to the inverters, the transistors M1 and M6 are both coupled to the WL 202-7 and each coupled to the BL 202-1 and BBL 202-2, respectively. The transistors M1 and M6 are typically referred to as access transistors of the bit 200-1. In some embodiments, the transistors M1, M3, M5, and M6 each includes an NMOS transistor, and M2 and M4 each includes a PMOS transistor. Although the illustrated embodiment of FIG. 2B shows that M1-M6 are either NMOS or PMOS transistors, any of a variety of transistors or devices that are suitable for use in a memory device may be implemented as at least one of M1-M6 such as, for example, a bipolar junction transistor (BJT), a high-electron mobility transistor (HEMT), etc.

In general, when an SRAM bit (e.g., 200-1, 200-2, 200-3, 200-4, etc.) presents/stores a data bit, a first node of the SRAM bit is configured to be at a first logical state (1 or 0), and a second node of the SRAM bit is configured to be at a second logical state (0 or 1), wherein the first and second logical states are complementary with each other. In some embodiments, the first logical state at the first node is the data bit stored by the SRAM cell. For example, in the illustrated embodiment of FIG. 2B, the bit 200-1 includes nodes 250 and 260. When the bit 200-1 presents a data bit (e.g., a logic 1), the node 250 is configured to be at the logic 1 state, and the node 260 is configured to be at the logic 0 state.

FIG. 2C illustrates exemplary circuit diagrams of transistors 211, 212 connected to columns of the PUF cell array in FIG. 2A, in accordance with various embodiments of the present disclosure. While the transistors 211, 212 shown in FIG. 2C are connected to bit line 202-1 and bit bar line 202-2, other transistors 211, 212 shown in FIG. 2A will have substantially same or similar structures to those of the transistors 211, 212 shown in FIG. 2C.

As shown in FIG. 2C, a drain end of the transistor 211 is electrically connected to the bit line 202-1; a source end of the transistor 211 is electrically connected to a system ground; and a gate end of the transistor 211 is controlled by the clear signal 221 generated by the reset circuit 130 based on the indication of the voltage tempering event. As such, when the clear signal 221 is activated by the reset circuit 130 upon detection of the voltage tempering event, the clear signal 221 has a logical state 1, which triggers the N-type transistor 211 to pull the voltage of the bit line 202-1 down to the system ground or logical state 0, which is an initial state of the bit line 202-1. In addition, a drain end of the transistor 212 is electrically connected to the bit bar line 202-2; a source end of the transistor 212 is electrically connected to a power supply voltage or logic high voltage; and a gate end of the transistor 212 is controlled by the clear bar signal 222 that is an inverse of the clear signal 221. As such, when the clear signal 221 is activated by the reset circuit 130 upon detection of the voltage tempering event, the clear signal 221 has a logical state 1 and the clear bar signal 222 has a logical state 0, which triggers the P-type transistor 212 to pull the voltage of the bit bar line 202-2 up to the power supply voltage or logical state 1, which is an initial state of the bit bar line 202-2. The transistor 211 and the transistor 212 can be implemented at any location along the column including the bit line 202-1 and the bit bar line 202-2.

Figure 3:
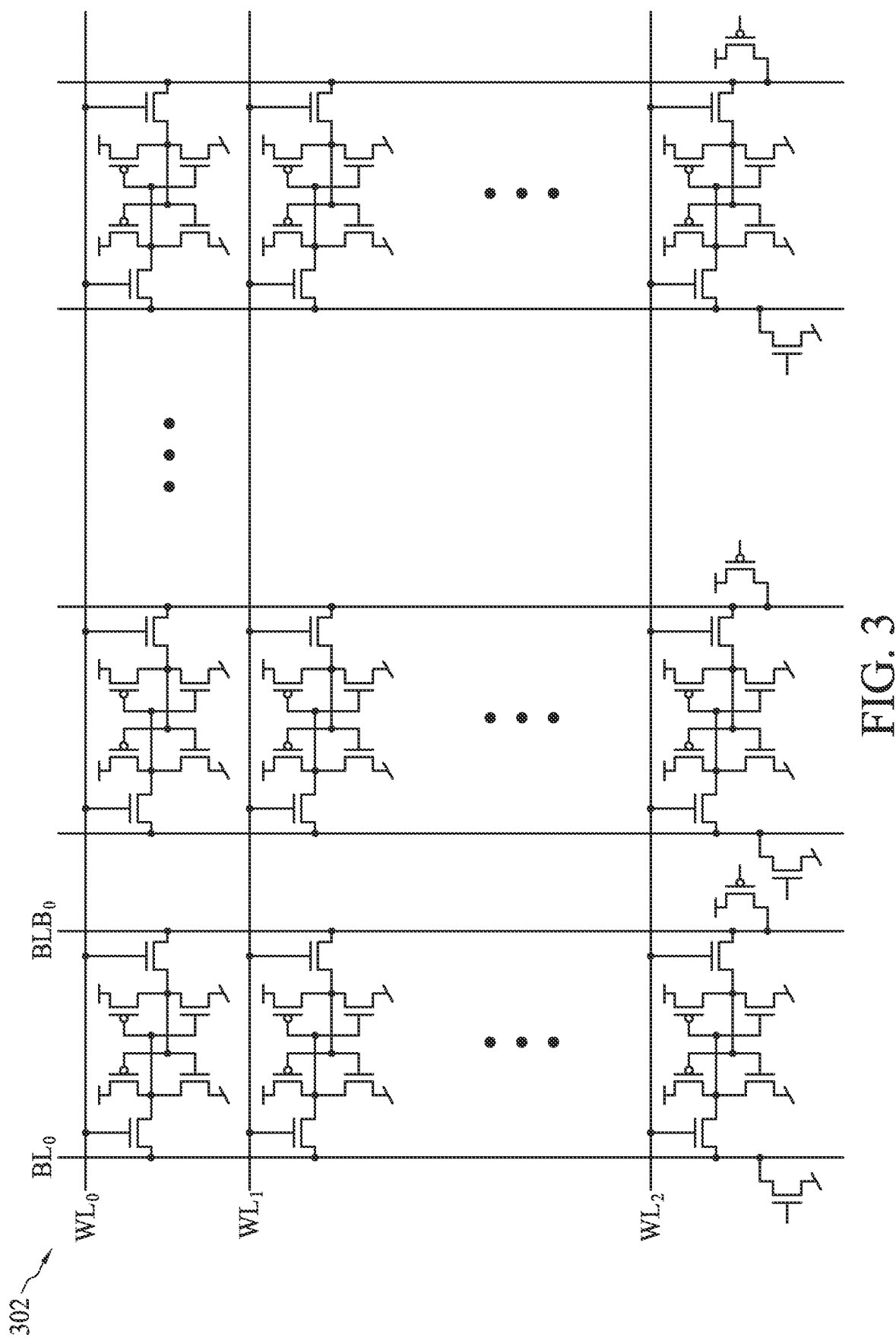
FIG. 3 illustrates an exemplary circuit diagram of a memory cell array comprising a plurality of bit cells, in accordance with various embodiments of the present disclosure.

FIG. 3 illustrates an exemplary circuit diagram of a memory cell array 302 comprising a plurality of bit cells, in accordance with various embodiments of the present disclosure. This memory cell array 302 shown in FIG. 3 has a same structure as that of the PUF cell array 102 shown in FIGS. 2A-2C. This illustrates that the PUF cell array 102 may serve as a memory cell array for storing user data; and the memory cell array 302 may serve as a PUF cell array for generating PUF signature. A multiplex-use of a same cell array to both store user data and generate PUF signatures can save implementation cost of an integrated circuit, while the disclosed structure of the cell array in addition to the reset circuit can prevent a cell retention failure attack on the cell array.

Figure 4:
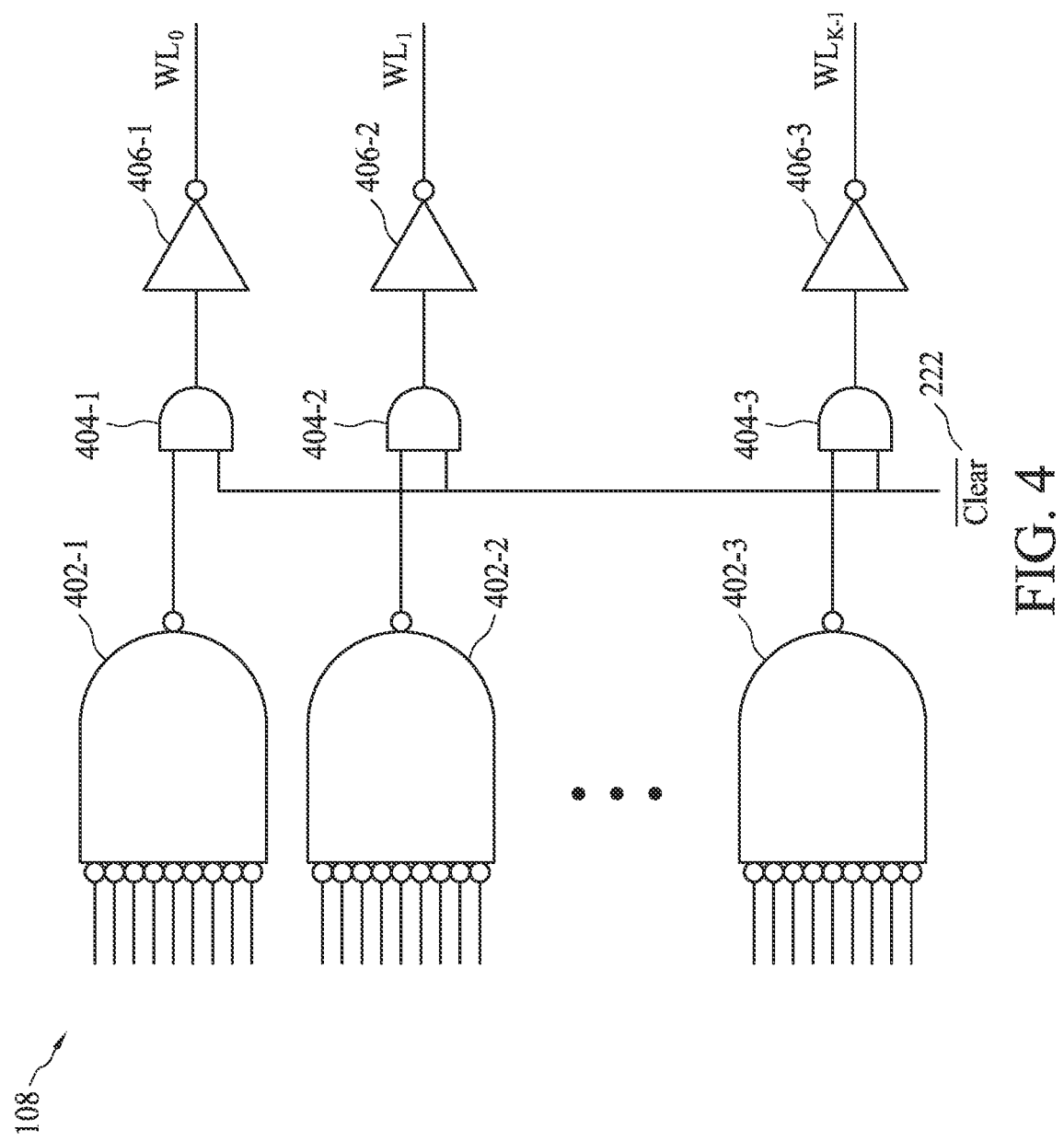
FIG. 4 illustrates an exemplary circuit diagram of a row decoder coupled to a PUF cell array, in accordance with various embodiments of the present disclosure.

FIG. 4 illustrates an exemplary circuit diagram of a row decoder, e.g. the row decoder 108 in FIG. 1, coupled to a PUF cell array, e.g. the PUF cell array 102 in FIG. 1 or the memory cell array 302 in FIG. 3, in accordance with various embodiments of the present disclosure. In this example, the row decoder 108 includes a plurality of inverters 406-1, 406-2, 406-3, a plurality of AND gates 404-1, 404-2, 404-3, and a plurality of NAND gates 402-1, 402-2, 402-3.

Each inverter has an output connected to a corresponding word line of the PUF cell array. Each AND gate has an output connected to an input of one of the plurality of inverters. Each NAND gate has an output connected to a first input of one of the plurality of AND gates. The second input of each of the plurality of AND gates 404-1, 404-2, 404-3 receives the clear bar signal 222 generated by the reset circuit 130.

During a normal operation of the integrated circuit, no voltage tempering is detected. In this case, the clear signal is not activated, such that the clear signal 221 has a logic 0 and the clear bar signal 222 has a logical state 1. As such, the output of each AND gate is equal to an output of the corresponding NAND gate. Each NAND gate has 9 inputs forming an input pattern corresponding to a row or word line of the cell array. To access a given row of the cell array, the row decoder 108 receives a given row address. Based on the given row address, only one NAND gate having an input pattern matching the given row address will generate an output 0, while all other NAND gates in the row decoder 108 will generate an output 1. In addition, only one AND gate will output a logic 0, while all other AND gates in the row decoder 108 will output a logic 1. Further, only one inverter will output a logic 1 to enable or turn on the corresponding word line, while all other inverters in the row decoder 108 will output a logic 0 to keep the other word lines turned off.

When a voltage tempering is detected, the clear signal is activated, such that the clear signal 221 has a logic 1 and the clear bar signal 222 has a logical state 0. As such, all AND gates 404-1, 404-2, 404-3 in the row decoder 108 will output a logic 0. As a result, all inverters 406-1, 406-2, 406-3 in the row decoder 108 will output a logic 1 to enable or turn on all word lines of the cell array. In this case, the row decoder 108 locks every word line of the cell array to a logic 1 to enable all word lines for resetting the bit cells of all rows of the cell array.

Figure 5:
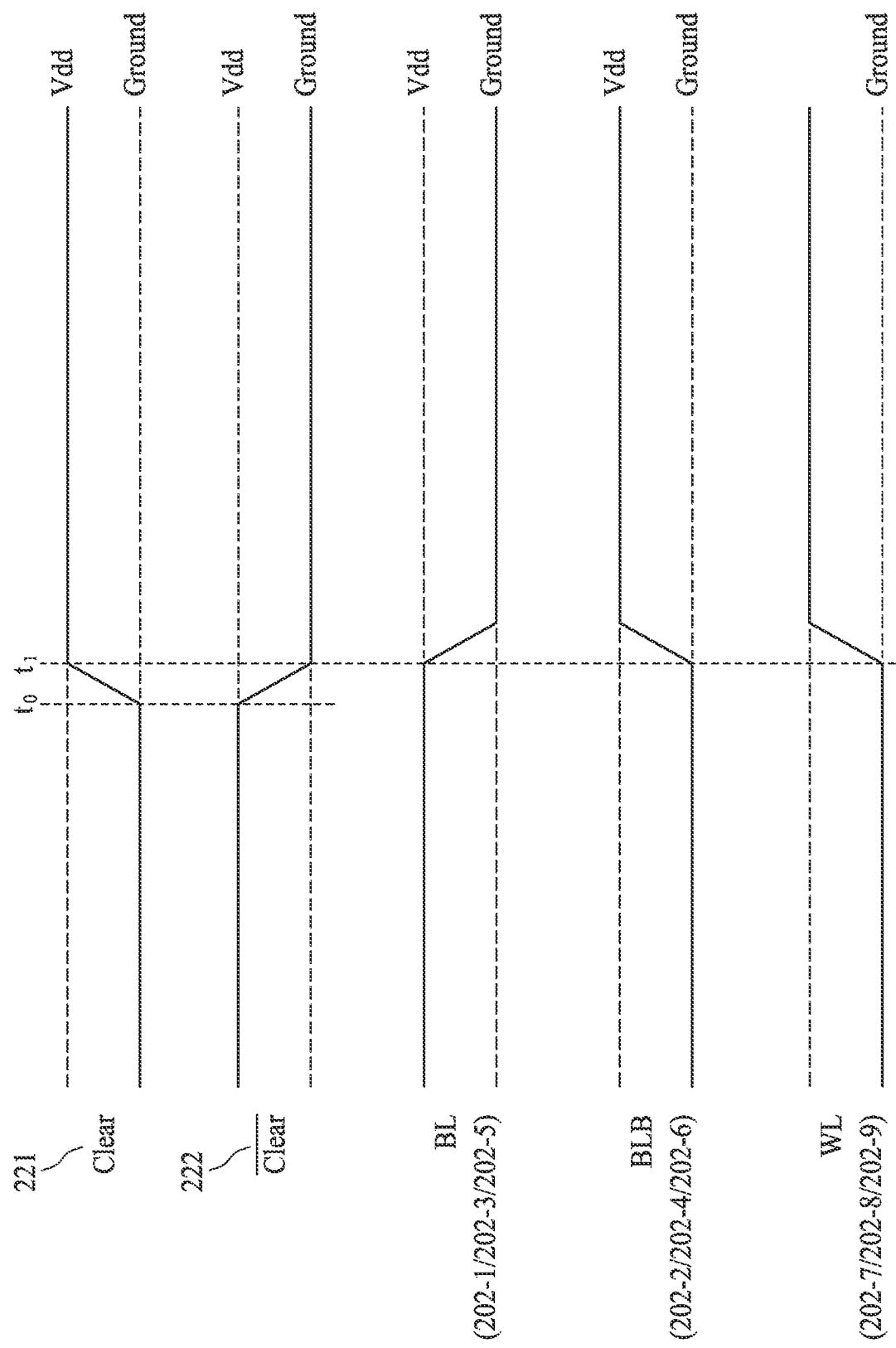
FIG. 5 illustrates waveforms of signals in a PUF cell array to reset each bit cell of the PUF cell array to its initial logical state, in accordance with various embodiments of the present disclosure.

FIG. 5 illustrates waveforms of signals in a PUF cell array, e.g. the PUF cell array 102 in FIGS. 1-2, to reset each bit cell of the PUF cell array to its initial logical state, in accordance with various embodiments of the present disclosure. The exemplary signals in FIG. 5 represent the clear signal 221, the clear bar signal 222, a BL, a BLB, and a WL, respectively. In accordance with various embodiments, the BL in FIG. 5 may represent any one of the BLs 202-1, 202-3, 202-5; the BLB in FIG. 5 may represent any one of the BLBs 202-2, 202-4, 202-6; and the WL in FIG. 5 may represent any one of the WLs 202-7, 202-8, 202-9.

Each of the signals transitions between a high logical state (e.g., Vdd) and a low logical state (e.g., ground) over time. In some embodiments, before a supply voltage tempering event is detected at time "$t_0$," the integrated circuit operates normally where the clear signal 221 is not activated. As such, the clear signal 221 has a voltage at logic low or ground; while the clear bar signal 222 has a voltage at logic high or Vdd accordingly. Before the time "to," the BL signal in this example is at logic high or Vdd; BLB signal in this example is at logic low or ground; and the WL signal in this example is at logic low or ground.

At time "$t_0$," a supply voltage tempering event is detected, such that the clear signal 221 is activated by pulling up the clear signal 221 from ground to Vdd, and pulling down the clear bar signal 222 from Vdd to ground. By time "$t_1$," the clear signal 221 reaches a stable state of Vdd or logic 1, while the clear bar signal 222 reaches a stable state of ground or logic 0. As discussed above, the clear signal 221 at logic 1 triggers transistors connected to each BL to lock the BL to a logic 0 by pulling down the BL signal from Vdd to ground at time "$t_1$"; and the clear bar signal 222 at logic 0 triggers transistors connected to each BLB to lock the BLB to a logic 1 by pulling up the BLB signal from ground to Vdd at time "$t_1$". In addition, at time "$t_1$," the clear bar signal 222 at logic 0 triggers the row decoder to enable all WLs to a logic 1 by pulling up all WL signals from ground to Vdd at time "$t_1$" to turn on all WLs for bit cell resetting.

Before the time "$t_1$," the voltage states of the BL signal, the BLB signal, and the WL signal in this example are for illustration only. In practice, different BL signals in the cell array may have different voltage states; different BLB signals in the cell array may have different voltage states; and different WL signals in the cell array may have different voltage states. But after time "$t_1$," due to the detection of the supply voltage tempering, all BL signals in the cell array are set to logic 0; all BLB signals in the cell array are set to logic 1; and all WL signals in the cell array are set to logic 0, to prevent a cell retention failure attack.

Figure 6:
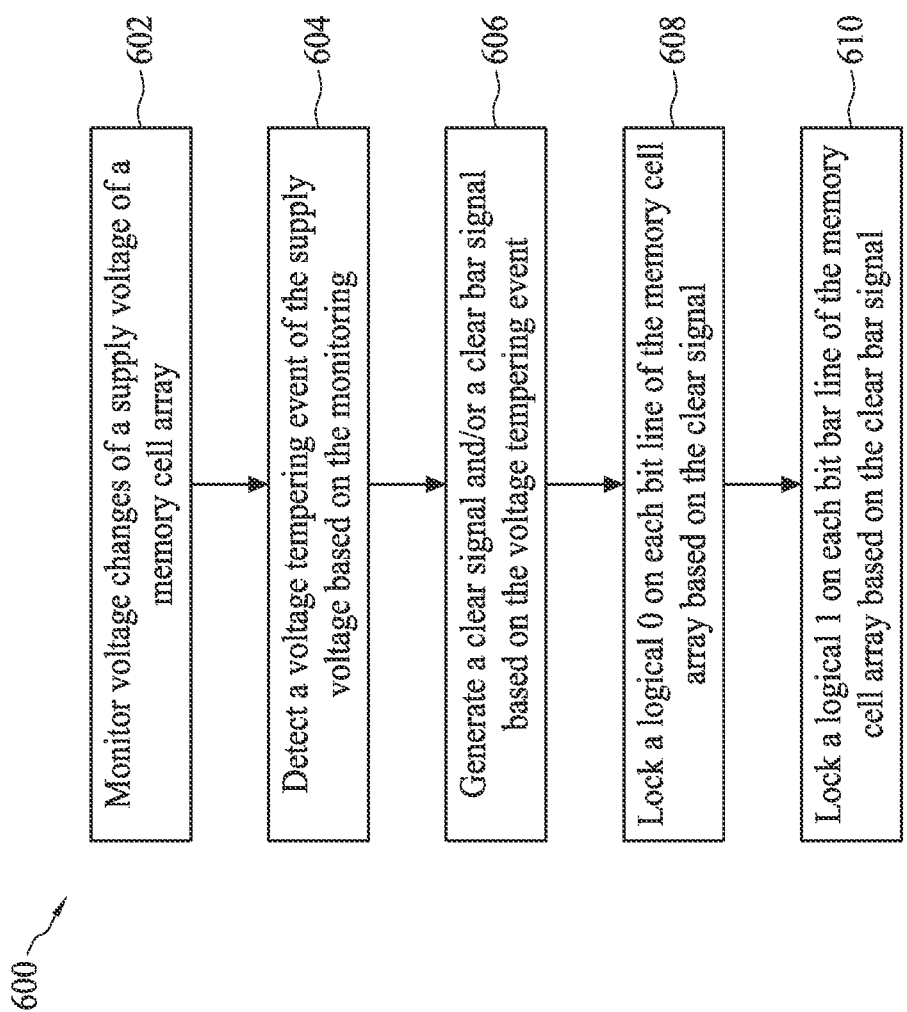
FIG. 6 illustrates a flow chart of a method for protecting a PUF generator from attack, in accordance with various embodiments of the present disclosure.

FIG. 6 illustrates a flow chart of a method 600 for protecting a PUF generator from attack, in accordance with various embodiments of the present disclosure. At operation 602, voltage changes of a supply voltage of a memory cell array are monitored. In one embodiment, the memory cell array comprises a plurality of bit cells whose stable logical states upon a power-up of the memory cell array are used to generate a PUF signature of the memory cell array. A voltage tempering event of the supply voltage is detected at operation 604 based on the monitoring. A clear signal and/or a clear bar signal is generated at operation 606 based on the voltage tempering event. At operation 608, a logic 0 is locked on each bit line of the memory cell array based on the clear signal. At operation 610, a logic 1 is locked on each bit bar line of the memory cell array based on the clear bar signal. The order of the steps shown in FIG. 6 may be changed according to different embodiments of the present disclosure.

In an embodiment of the present teaching, a PUF generator is disclosed. The PUF generator includes a PUF cell array, a PUF control circuit and a reset circuit. The PUF cell array comprises a plurality of bit cells. Each of the plurality of bit cells is configurable into at least two different stable states. The PUF control circuit is coupled to the PUF cell array and is configured to access each of the plurality of bit cells to determine one of the at least two different stable states upon a power-up of the plurality of bit cells, and generate a PUF signature based on the determined stable states of the plurality of bit cells. The reset circuit is coupled to the PUF cell array and is configured to set the plurality of bit cells to represent their initialization data based on an indication of a voltage tempering event of a supply voltage of the PUF cell array.

In another embodiment of the present teaching, a memory device is disclosed. The memory device includes a memory cell array, a PUF control circuit and a reset circuit. The memory cell array comprises a plurality of bit cells. Each of the plurality of bit cells is configurable into at least two different stable states. The PUF control circuit is coupled to the memory cell array and is configured to access each of the plurality of bit cells to determine one of the at least two different stable states upon a power-up of the plurality of bit cells, and generate a PUF signature based on the determined stable states of the plurality of bit cells. The reset circuit is coupled to the memory cell array and is configured to set the plurality of bit cells to represent their initialization data based on an indication of a voltage tempering event of a supply voltage of the memory cell array.

In yet another embodiment of the present teaching, a method for protecting a PUF generator from attack is disclosed. The method comprising: monitoring voltage changes of a supply voltage of a memory cell array, wherein the memory cell array comprises a plurality of bit cells whose stable logical states upon a power-up of the memory cell array are used to generate a PUF signature; detecting a voltage tempering event of the supply voltage based on the monitoring; generating a clear signal based on the voltage tempering event; and setting each of the plurality of bit cells to its initial logical state based on the clear signal.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A physical unclonable function (PUF) generator, comprising:
   a PUF cell array that comprises a plurality of bit cells;
   a PUF control circuit coupled to the PUF cell array, wherein the PUF control circuit is configured to:
      determine a stable state for each of the plurality of bit cells, and
      generate a PUF signature based on the determined stable states of the plurality of bit cells; and
   a reset circuit coupled to the PUF cell array, wherein the reset circuit is configured to set the plurality of bit cells to represent their initialization data in response to a triggering event.

2. The PUF generator of claim 1, wherein the initialization data of the plurality of bit cells are set based on their initial logical states before the PUF cell array stores any user data and the initial logical states of the plurality of bit cells are equal to all logic 0s or all logic 1s.

3. The PUF generator of claim 1, wherein the triggering event comprises a voltage tempering event of a supply voltage of the PUF cell array, and wherein the voltage tempering event happens when there is a voltage droop or glitch of the supply voltage of the PUF cell array.

4. The PUF generator of claim 3, wherein:
   the PUF generator further comprises a voltage tempering detector that is configured to:
      detect the voltage tempering event of the supply voltage of the PUF cell array, and
      send the indication to the reset circuit upon the detection.

5. The PUF generator of claim 1, wherein:
   each column of the PUF cell array includes a bit line and a bit bar line;
   each bit line is electrically connected to a drain end of a first transistor, wherein a source end of the first transistor is electrically connected to a system ground, and wherein a gate end of the first transistor is controlled by a clear signal generated by the reset circuit in response to the triggering event; and
   each bit bar line is electrically connected to a drain end of a second transistor, wherein a source end of the second transistor is electrically connected to a logic high voltage, and wherein a gate end of the second transistor is controlled by a clear bar signal that is a reverse of the clear signal.

6. The PUF generator of claim 5, wherein:
   the clear signal triggers the first transistor to lock the bit line to its initial logical state; and
   the clear bar signal triggers the second transistor to lock the bit bar line to its initial logical state.

7. The PUF generator of claim 5, wherein the reset circuit is further configured to:
   determine a voltage droop of a supply voltage of the PUF cell array based on the indication;
   compare the voltage droop with a predetermined threshold;
   generate the clear signal and the clear bar signal in response to the voltage droop being larger than the predetermined threshold;
   use the clear signal to lock a logic 0 on each bit line; and
   use the clear bar signal to lock a logic 1 on each bit bar line.

8. The PUF generator of claim 5, further comprising a row decoder coupled to all word lines of the PUF cell array, wherein the row decoder is configured to:
   receive a row address of the PUF cell array;
   assert a word line at the row address;
   receive the clear bar signal generated by the reset circuit; and
   lock each word line to a logic 1 based on the clear bar signal.

9. The PUF generator of claim 8, wherein the row decoder comprises:
   a plurality of inverters each having an output connected to a corresponding word line of the PUF cell array;
   a plurality of AND gates each having an output connected to an input of one of the plurality of inverters; and
   a plurality of NAND gates each having an output connected to a first input of one of the plurality of AND gates, wherein a second input of each of the plurality of AND gates receives the clear bar signal.

10. The PUF generator of claim 4, wherein the reset circuit is configured to set the plurality of bit cells to their initial logical states simultaneously.

11. The PUF generator of claim 4, wherein the reset circuit comprises a finite state machine (FSM) that resets bit cells of each row to their initial logical states, one row at a time.

12. The PUF generator of claim 1, wherein the PUF cell array is a memory cell array configured for storing user data.

13. A memory device, comprising:
   a memory cell array that comprises a plurality of bit cells;
   a physical unclonable function (PUF) control circuit coupled to the memory cell array, wherein the PUF control circuit is configured to determine a stable state for each of the plurality of bit cells; and
   a reset circuit coupled to the memory cell array, wherein the reset circuit is configured to set the plurality of bit cells to represent their initialization data.

14. The memory device of claim 13, wherein the initialization data of the plurality of bit cells are predetermined based on their initial logical states before the memory cell array stores any user data and the initial logical states of the plurality of bit cells are equal to all logic 0s or all logic 1s.

15. The memory device of claim 13, wherein:
   each column of the memory cell array includes a bit line and a bit bar line;
   each bit line is electrically connected to a drain end of a first transistor, wherein
      a source end of the first transistor is electrically connected to a system ground,
      a gate end of the first transistor is controlled by a clear signal generated by the reset circuit based on the indication of the voltage tempering event, and
      the clear signal triggers the first transistor to lock the bit line to its initial logical state; and
   each bit bar line is electrically connected to a drain end of a second transistor, wherein
      a source end of the second transistor is electrically connected to a logic high voltage,
      a gate end of the second transistor is controlled by a clear bar signal that is a reverse of the clear signal, and
      the clear bar signal triggers the second transistor to lock the bit bar line to its initial logical state.

16. The memory device of claim 13, wherein the reset circuit is further configured to determine a voltage droop based on an indication of a voltage tempering event of a supply voltage of the memory cell array;

compare the voltage droop with a predetermined threshold;

generate the clear signal and the clear bar signal in response to the voltage droop being larger than the predetermined threshold;

use the clear signal to lock a logic 0 on each bit line; and use the clear bar signal to lock a logic 1 on each bit bar line.

17. The memory device of claim 13, further comprising a row decoder coupled to all word lines of the memory cell array, wherein the row decoder comprises:
   a plurality of inverters each having an output connected to a corresponding word line of the memory cell array;
   a plurality of AND gates each having an output connected to an input of one of the plurality of inverters; and
   a plurality of NAND gates each having an output connected to a first input of one of the plurality of AND gates, wherein a second input of each of the plurality of AND gates receives the clear bar signal to lock each word line to a logic 1 based on the clear bar signal.

18. A method, comprising:
   monitoring voltage changes of a supply voltage of a memory cell array, wherein the memory cell array comprises a plurality of bit cells whose stable logical states are used to generate a physical unclonable function (PUF) signature;
   detecting a voltage tempering event of the supply voltage; and
   setting each of the plurality of bit cells to its initial logical state based on the voltage tempering event.

19. The method of claim 18, further comprising:
   generating a clear signal based on the voltage tempering event; and
   generating a clear bar signal that is a reverse of the clear signal based on the clear signal, wherein the setting comprises:
      locking a logic 0 on each bit line of the memory cell array based on the clear signal, and
      locking a logic 1 on each bit bar line of the memory cell array based on the clear bar signal.

20. The method of claim 18, wherein bit cells of each row of the memory cell array are set to their initial logical states, one row at a time.

* * * * *